Jan. 3, 1967 W. D. VAN DYKE 3,295,364
COMPUTING ACCELEROMETER
Filed Jan. 30, 1964 2 Sheets-Sheet 1

INVENTOR.
WILLIAM D. VAN DYKE
BY
Leon D. Rosen
ATTORNEY

INVENTOR.
WILLIAM D. VAN DYKE
BY
Leon D. Rosen
ATTORNEY

United States Patent Office 3,295,364
Patented Jan. 3, 1967

3,295,364
COMPUTING ACCELEROMETER
William D. Van Dyke, Palos Verdes Estates, Calif., assignor to Douglas Aircraft Company, Inc., Santa Monica, Calif.
Filed Jan. 30, 1964, Ser. No. 341,234
4 Claims. (Cl. 73—88.5)

This invention relates to a system for monitoring the fatigue stress damage experienced by a repeatedly stressed structure.

In applications which utilize structures of light weight which bear large varying loads, there is a constant danger of fatigue failure. One of the most important of such applications is in aircraft wherein lightweight wings are employed which are subjected to loads which repeatedly vary in magnitude. The subjection of a wing to numerous large load or stress changes results in the formation of cracks in the wing and to its eventual failure. The terms stress and load are generally used interchangeably herein. In order to prevent failure, the most highly stressed parts are sometimes replaced after a certain number of hours of use. This procedure is wasteful inasmuch as some airplanes may be placed in very rigorous service such as continually carrying full loads, flying in maneuvers wherein great stresses are encountered, and flying in rough weather, while other aircraft may operate for the same period under conditions of low stresses wherein little fatigue damage is sustained. To require the replacement of a wing or other part on the assumption that it has been employed in the most rigorous service during each hour of use is wasteful, yet is the only same assumption when the foregoing calculation is used.

It has been proposed to use a strain measuring instrument and a counter to count the number of stress applications in order to account for fatigue damage actually sustained. Since fatigue damage depends on the magnitude of a stress application, the proposals have generally included may strain gauges connected to many counters, each counter adapted to count the number of stress reversals within a certain range of magnitudes of stress change. At convenient intervals, the information from all of the counters was to be noted and used in calculations, the results of the calculations being compared to formulas or graphs to determine whether there was substantial danger of fatigue failure. Inasmuch as many sets of strain gauges and counters would be required, the prior proposed systems were expensive and wasteful of space and weight. However, the major difficulty was that considerable time and effort were required to make the calculations to determine the fatigue damage at any given time.

In the device of this invention, generally only one strain gauge, accelerometer or other stress determining instrument and one counter are employed. The counter system is so designed that for each application of a load it registers a count dependent on the magnitude of the load or resulting stress. The change of the counter for a stress application is approximately proportional to the effect on fatigue life of that stress application.

The effect of any given magitude of stress application on the fatigue life of a part is determined from fatigue curves which show the number of cycles at any given level of stress needed to cause fatigue failure. A stress level which causes failure in half the number of occurrences is assigned approximately twice the count on the counter of the invention. The fatigue curves are generally experimentally derived.

The fatigue monitoring system of the present invention is useful in indicating when the fatigue life of a critical part is nearing its end, so that it may be replaced or very carefully examined for fatigue damage. Maintenance personnel or other responsible persons are instructed to report when a certain predetermined number is reached by the counter, the number being chosen so that when it is reached there is generally danger that the fatigue life of the part is ending. Inasmuch as the system requires only the reading of a couner and comparing the reading to a given number, the system enables the fatigue monitoring of structures in a very simple manner.

Accordingly, one object of the present invention is to provide a fatigue monitoring system which is simple, reliable and efficient.

Another object of the invention is to provide a fatigue monitoring system which continually provides a single count or number indicating already experienced fatigue damage.

A further object of the present invention is to provide an instrument for recording and presenting in a digested form, the stress history of a structure.

A still further object of the invention is to provide a device for automatically weighing, recording, and presenting in a simple form the effects of a repeatedly encountered phenomenon.

These and other objects and a more complete understanding of the invention may be had by reference to the following description and claims taken in conjunction with the accompanying drawings in which:

Figure 1:
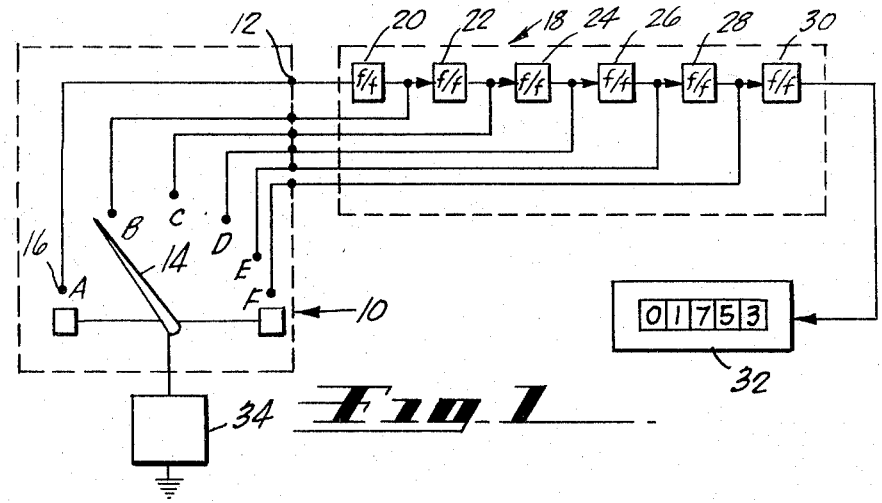
FIGURE 1 is a representational view of a fatigue monitoring system constructed in accordance with the present invention.

With reference to the drawings, and more particularly to FIG. 1, one embodiment of the invention comprises an accelerometer 10 adapted to be placed in an airplane to monitor the fatigue stresses encountered by the wing structure of the airplane as it is shaken and jolted during its operation. The accelerometer 10 includes six output terminals 12, one terminal being provided for each of six levels of acceleration. When a certain magnitude of acceleration is encountered, an indicating wiper 14 swings through an arc, briefly touching several contacts 16 and causing a pulse of current to flow through each touched contact to an output terminal 12 associated with it.

The output terminals 12 of the accelerometer are connected to a counting or metering circuit 18 which is composed of several flip-flop subcircuits 20, 22, 24, 26, 28 and 30. Each flip-flop subcircuit yields one pulse output after two input pulses are conducted to it, thus serving as a metering means to control the advancing of a counter 32. A first accelerometer output terminal A, through which is transmitted a pulse when low levels of shock are encountered, is connected to a first flip-flop 20. After every two pulse inputs to the first flip-flop 20, it delivers a pulse to a second flip-flop 22. A second accelerometer output terminal B through which is transmitted a pulse when a higher level of shock is encountered, is also connected to the second flip-flop 22. The second flip-flop 22 delivers a pulse to a third flip-flop 24 after every two pulse inputs to it. Thus, one input over terminal B has the same "weight" as two inputs over the terminal A. The other flip-flops 24, 26, 28 and 30 similarly yield one output pulse for every two input pulses. The other accelerometer output terminals C, D, E and F which deliver pulses for higher acceleration levels are connected to the input terminals of the additional flip-flops 24, 26, 28 and 30, respectively.

The last flip-flop 30 delivers pulses to an electric counter 32. It requires sixty-four pulses from the accelerometer terminal A or two pulses from the terminal F to provide a pulse to the counter 32 and cause it to advance. An intermediate number of pulses is required from the other accelerometer terminals B, C, D and E to cause the counter to advance by a count of one.

A low pass filter circuit 34 is provided to prevent false counts when the wiper 14 of the accelerometer vibrates and rapidly makes and breaks connection with the contacts.

Although acceleration is measured, it is the stresses encountered by a part, not the accelerations, that determine fatigue life. For many structures, especially the wings of an airplane, there is a direct correlation between stresses on the wing structure and the acceleration of the fuselage wherein the device of the invention is generally placed, and the relationship is calculable for a given airplane. Where desired, a strain gauge with several outputs corresponding to several levels of strain may be used in place of an accelerometer.

The relative placement of the contacts 16 for each accelerometer output is not necessarily such as to require twice the acceleration for the wiper 14 to swing to contact B as to swing to contact A or for other terminals placed in succession. Rather, it requires a shock having about twice the deleterious effect to cause the wiper 14 to swing to the next contact (the touching of preceding contacts as the wiper swings is disregarded at this point for the sake of clarity).

Figure 2:
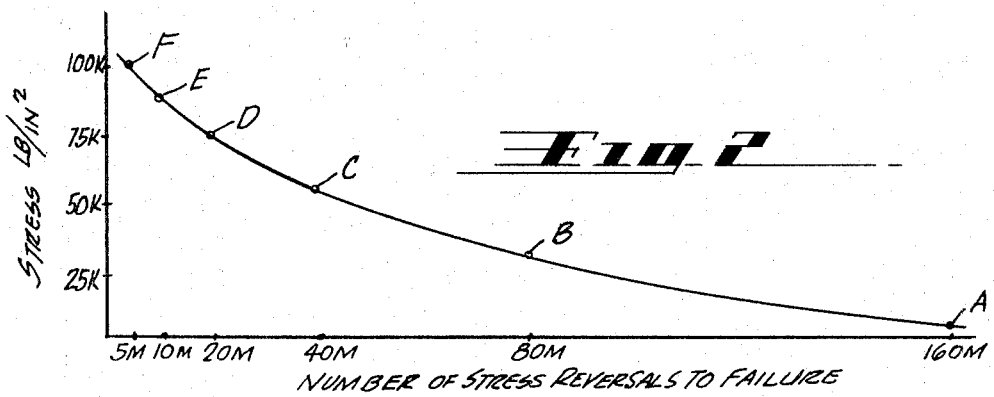
FIG. 2 is a typical fatigue failure curve showing a typical relationship between magnitude of stress reversals and the number of stress reversals required to cause fatigue failure of a part.

The determination of which shock levels to use for the various accelerometer contacts may be made by a study of a fatigue failure curve of the type illustrated in FIG. 2. This curve shows the number of stress reversals of a given magnitude needed to cause fatigue failure of a part similar to the wing structure or other structure to be monitored by the device of the invention. The curve is generally constructed from experimental data taken from experiments in which parts are repeatedly stressed until they fail. In the tests, it is generally preferable to employ a part identical to the part actually to be monitored, because the exact contour, surface finish, treatment of the metal, and other characteristics which are hard to duplicate in the generally more economical test specimens, are very important in determining the fatigue life of a part.

In choosing the stress levels to correspond to contact points of the accelerometer, several points may be chosen on the fatigue failure curve wherein twice the number of stress reversals is required for failure at a point as for the next chosen point along the curve. For example, point C in the graph of FIG. 2 requires 40 thousand cycles for failure, point B requires 80 thousand cycles which is twice as many as for point C, and point A requires 160 thousand cycles which is twice as many as is required for point B. As would be expected, a stress reversal of the magnitude indicated at point B generally has about twice the deleterious effect on fatigue life as a stress reveral of the magnitude of point A, even though the part encounters stresses of many different levels during its life rather than the one level used in tests to obtain the curve of FIG. 2. Thus, the accelerometer of FIG. 1 is constructed so that the wiper 14 will touch contact A when a stress level corresponding to the stress of point A on the graph of FIG. 2 is encountered, the wiper will touch contact B when a stress level corresponding to the stress at point B on the graph is encountered, and so forth. The acceleration required for the production of a given stress is calculated for the particular craft and its usual operating conditions.

It should be noted that many intermediate shock levels yielding stresses between those accounted for by points A, B, C, etc., are treated as though they were shocks of the next preceding lower level. The intermediate shocks may be accounted for by requiring a greater count on the counter 32 to indicate that the danger of fatigue failure is imminent. The amount of the greater count may be calculated by taking into account the statistical probability of intermediate shock levels, by establishing the critical number on the counter empirically without any calculations merely by testing parts, or in other ways.

It should also be noted that for the general type of accelerometer 10 described hereinbefore, the wiper 14 touches all preceding contacts 16 when it swings to a contact which indicates a large acceleration such as contact F. Additionally, when the needle swings down, it again touches all contacts. These factors cause a count of almost four times the count that would be taken if only one pulse were received from the highest contact passed by the wiper 14. Accordingly, one simple method of accounting for this factor is to require a count of slightly more than one-fourth what would otherwise be required to indicate a certain amount of fatigue damage.

Figure 3:
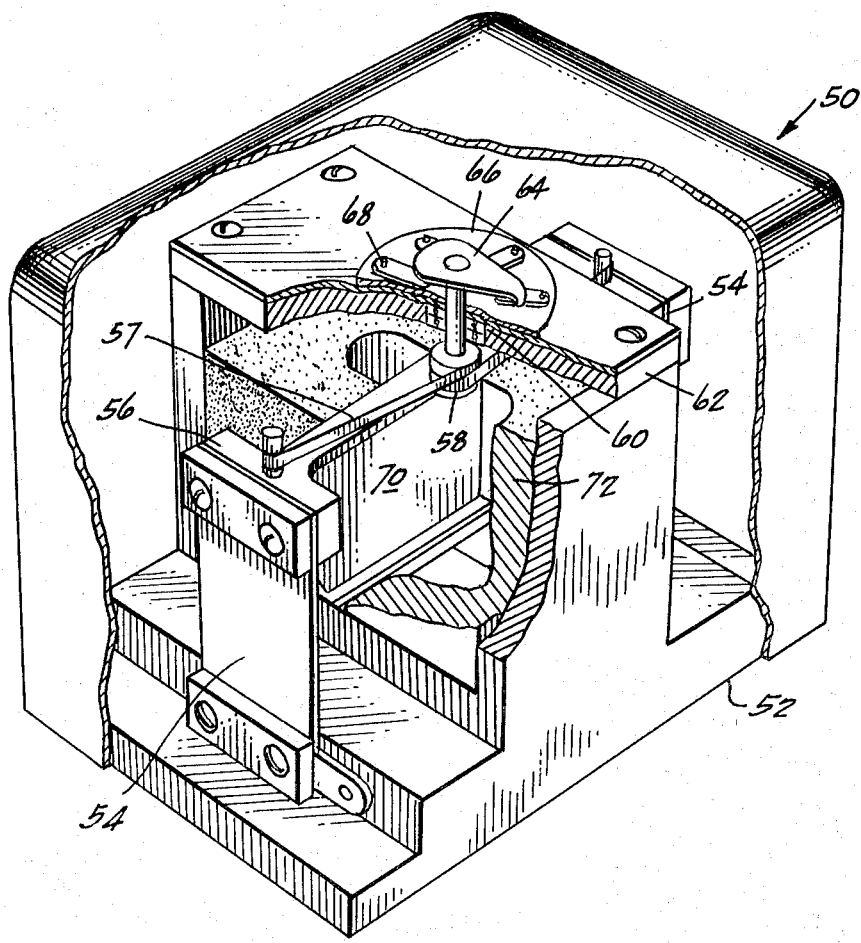
FIG. 3 is a pictorial view of an accelerometer constructed in accordance with the present invention.

The details of an accelerometer which may be used in the system of the invention are shown in FIG. 3. The accelerometer 50 comprises a base 52 on opposite sides of which are mounted two elastic suspensions 54. The elastic suspensions are strips of spring steel or the like. A mass 56 is mounted between free ends of the suspensions 54 so that the mass is free to swing back and forth under accelerating forces.

The mass 56 includes an integral damping vane 70 which extends between the poles of two magnets 72. The vane 70 is of a conducting material such as aluminum, so that as it moves between the magnetic poles a current is induced in the vane. The current is dissipated as heat and serves to damp the movement of the mass 56.

Two ribbon drives 57 comprising very thin strips of steel are fixed to opposite ends of the mass and to a center spindle 58. The spindle is rotatably mounted in ball bearings 60 which are fixed to a plate 62 covering the base 52. As the mass 56 moves back and forth, the ribbon drives 57 cause the oscillation or rotation of the spindle 58. A wiper 64 is fixed to the spindle, the wiper oscillating as the spindle oscillates. The wiper is constructed of a good electrical contacting material such as a platinum-paladium alloy.

A digit disk 66 is mounted on the plate 62 around the spindle. The digit disk is a plate of insulation material on which are plated six contacts 68 situated flush with the digit disk surface. When an acceleration is encountered and the wiper 64 rotates, it moves across the digit disk and makes electrical connection with the contacts 68. Each contact 68 corresponds to the contacts A, B, C, D, E and F of FIG. 1. Wires from each of the contacts 68 pass through the accelerometer to a plug (not shown) at the bottom of the base 52. The wiper 64, which is a common terminal, makes electrical connection through the spindle 58, ribbons 57, elastic suspension 54 and a wire (not shown) to a terminal of the plug to which the several contacts 68 are connected. The plug is connected to a circuit similar to the circuit 18 of FIG. 1.

Figure 4:
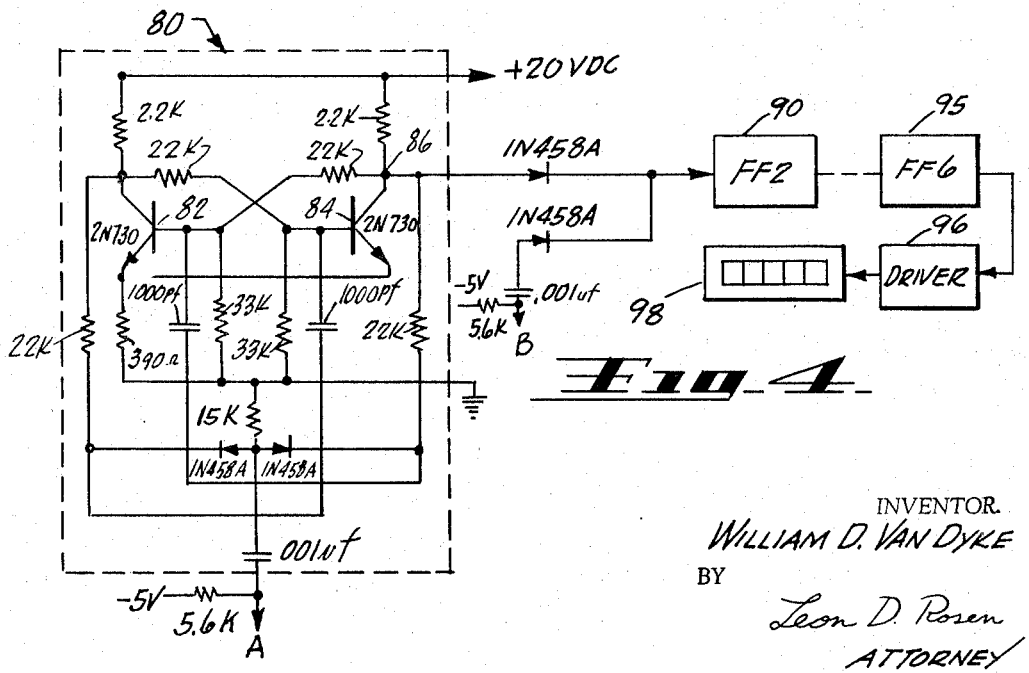
FIG. 4 is a circuit diagram of a counting circuit constructed for use in accordance with the present invention.

One stage of a counting circuit shown at 18 in FIG. 1 is shown in greater detail in FIG. 4. An input pulse from a contact of the accelerometer, contact A, changes the state of the first flip-flop circuit 80. Circuit 80 is an ordinary type of flip-flop in which the pulse from contact A causes whichever of the transistors 82 or 84 that is conducting to cease conducting and the other transistor to change to a conducting state. A junction 86 between transistor 84 and a +20 volt source is connected to the next flip-flop stage 90 through a diode. At every other pulse input to flip-flop 80 from contact A, transistor 84 becomes nonconducting and the voltage at junction 86 suddenly rises to almost 20 volts. The sudden rise is transmitted as a pulse input to the next flip-flop 90 which is constructed in a manner similar to flip-flop 80. Also leading to the input of the second flip-flop 90 is a conductor from contact B. A pulse from either the first flip-flop or from contact B will change the state of the second flip-flop 90. The other four flip-flops are similarly constructed.

The output from the last flip-flop 95 is conducted to a driver circuit 96 which yields a strong pulse for each input pulse to it, to drive the electric counter 98. Generally the electric counter 98 is made to advance, though it can be made to count down from a certain number so that the reaching of zero indicates that there is danger of fatigue failure.

In the operation of the device, it is sometimes found that a vibration of the accelerometer wiper occurs, which can yield additional pulses as the wiper rapidly makes and breaks connection with a contact as it approaches the contact. These additional pulses would lead to erroneous readings if they were counted. A low pass filter 34 shown in FIG. 1 can be used to prevent the transmittal of these pulses to the flip-flop circuits. The use of a low pass filter generally tends to decrease the sharpness of the pulse input to the flip-flop circuits and special precautions may sometimes have to be employed to assure that the flip-flops will respond. Circuits may be provided between each accelerometer contact and the flip-flop circuit to which it is connected to increase the sharpness of the pulse, or between the wiper 14 and ground.

Although a particular embodiment of the invention has been described, obviously many other types of equipment including the use of strain gauges or other indicating devices and various counting systems will be apparent to those skilled in the arts to which the invention pertains. However, it should be understood that the invention relates to the general method of monitoring fatigue stresses by not only counting the occurrences, whether by distinct digits or in an analog fashion, but by advancing the count more upon the occurrence of greater stress changes so that the total count reflects the fatigue damage done to the part or the fatigue life remaining. Accordingly, it should be understood that various embodiments of the invention may be made without departing from the scope of the invention as defined in the appended claims.

I claim:
1. A fatigue monitor comprising:
a measuring means for providing an indication of stress levels to which a structure is subjected, said measuring means including a plurality of outputs wherein each output is adapted to deliver a distinct output signal when a predetermined stress level associated with that output is reached;
counting means for providing an indication representative of the fatigue history of the structure monitored; and
metering means for changing the indication of said counting means, said metering means including a plurality of subcircuits each having an input and an output wherein said subcircuits are connected in series in a series combination and adapted to produce upon receipt of at least two input signals one output signal which can change the state of the following subcircuit, said measuring means outputs being connected to said subcircuit inputs, respectively, and said counting means being responsively connected to the output of said series combination whereby said distinct output signals are applied to said subcircuit inputs when the predetermined stress levels are reached to change the indication of said counting means.

2. A fatigue monitor as defined in claim 1 wherein: said distinct output signals are electrical pulses, and said counting means is a digital counter.

3. A fatigue monitor comprising:
an accelerometer adapted to be mounted to structure at a location thereon wherein acceleration levels sensed by said accelerometer are directly correlated in a generally known manner to stress levels experienced by certain parts of the structure and including a wiper movably responsive to acceleration and a plurality of contacts adjacent the path of said wiper, said contacts situated so as to be touched sequentially by said wiper which applies a signal thereto;
a plurality of corresponding flip-flop circuits each including an input and an output, said circuits being connected in series in a series combination and said contacts being connected to said inputs, respectively, whereby signals are applied to said inputs when an acceleration occurs moving said wiper to touch said contacts and change the state of their respectively connected circuits; and
an electrical digital counter means responsively connected to the output of the series combination of said plurality of flip-flop circuits.

4. A fatigue monitor as defined in claim 3 including:
a low pass filter means connected to said wiper and having a pass band which prevents the passage to said inputs of distinct signals occurring within a time period shorter than the minimum time required for said wiper to move from one contact to an adjacent contact.

References Cited by the Examiner
UNITED STATES PATENTS

| | | | |
|---|---|---|---|
| 2,702,186 | 2/1955 | Head et al. | 73—517 |
| 2,719,428 | 10/1955 | Lambie | 73—91 X |
| 2,879,053 | 3/1959 | Weaver | 73—517 |
| 2,945,379 | 7/1960 | Barnes et al. | 73—517 |
| 3,002,186 | 9/1961 | Schlangen | 73—313 X |

RICHARD C. QUEISSER, *Primary Examiner.*

C. A. RUEHL, *Assistant Examiner.*